United States Patent
Leibach et al.

[15] 3,685,738
[45] Aug. 22, 1972

[54] THRUST NOZZLE WHOSE GAS DISCHARGE CROSS-SECTION IS ADAPTED TO BE ADJUSTED BY MEANS OF ADJUSTING FLAPS

[72] Inventors: Heinrich Leibach, Moosstrasse 24, 8031 Puchheim; Ludwig Schweikl, Kolpingstrasse 5, 8052 Moosburg; Paul Lottes, Luisenstrasse 8, 859 Marktredwitz, all of Germany

[22] Filed: Dec. 22, 1969

[21] Appl. No.: 887,238

[52] U.S. Cl. ....239/265.39, 239/265.19, 239/265.43
[51] Int. Cl. ..................B63h 11/10, B64c 15/00
[58] Field of Search.......269/265.33, 265.37, 265.39, 269/265.13, 265.19, 265.29, 265.25, 265.27, 265.31; 60/236

[56] References Cited

UNITED STATES PATENTS

2,987,877   6/1961   Torell.........................60/236
3,460,763   8/1969   Kopp....................239/265.43
3,519,207   7/1970   Clough..................239/265.19
2,831,321   4/1958   Laucher................239/265.39
2,968,150   1/1961   Goebel et al. ........239/265.37
2,970,429   2/1961   Dreifke.............239/265.39 X
3,048,973   8/1962   Benedict...........239/265.39 X Primary Examiner—Lloyd L. King
Attorney—Craig, Antonelli and Hill

[57] ABSTRACT

A thrust nozzle whose gas discharge cross-section is adapted to be changed by means of adjusting flaps, particularly for aircrafts which are equipped with turbo-jet propulsion units, whereby nozzle flaps are adapted to be extended out of the uniformly tapering fuselage tail-end of an aircraft for the purpose of reducing the gas discharge cross-section and are adapted to be retracted into the aircraft tail-end for the purpose of increasing the gas discharge aperture; the flaps form in the fully extended position an extension of the tail-end of the fuselage.

44 Claims, 10 Drawing Figures

PATENTED AUG 22 1972          3,685,738

INVENTORS
HEINRICH LEIBACH
LUDWIG SCHWEIKL
PAUL LOTTES

BY
Craig, Antonelli, Stewart & Hill

ATTORNEYS

THRUST NOZZLE WHOSE GAS DISCHARGE CROSS-SECTION IS ADAPTED TO BE ADJUSTED BY MEANS OF ADJUSTING FLAPS

The present invention relates to a thrust nozzle whose gas discharge cross-section is adjustable by means of adjusting flaps, especially for aircrafts which are equipped with turbo-jet power plants.

Thrust nozzles for turbo-jet engines are already known in the prior art which are provided with adjusting flaps disposed adjacent one another in the circumferential direction and pivotally supported about axis directed transversely to the nozzle center axis.

For the purposes of reducing the gas discharge cross-section with these known thrust nozzles, all flaps are simultaneously pivoted into the gas stream, and for the purpose of increasing the gas discharge cross-section the flaps are simultaneously pivoted toward the outside. In order to be able to reduce with these prior art thrust nozzles the gas discharge cross-section, considerable adjusting forces have to be thus overcome owing to the pivoting movement of the flaps into the gas stream. By reason of these high adjusting forces also the mechanism for the adjustment of the flaps has to assume considerable dimensions in these prior art thrust nozzle arrangements, and furthermore it is necessary in connection therewith to provide high-power adjusting motors, and especially with such types of motors which are driven as auxiliary aggregates or units from the drive unit or power plant, i.e., for example, with air of pneumatic motors driven by bled compressor air of the power plant, such prior art nozzle-flap-adjusting mechanisms cause a power reduction of the power plant or drive unit that is not inconsiderable. Especially with a required after-burning of the power plant exhaust gases and with the pressure increase of the gases connected therewith, such high adjusting forces result with the use of the prior art thrust nozzle flap adjusting mechanisms as are undesirable in practice.

Therebeyond with such a type of an arrangement of the adjusting flaps there exists, as already mentioned, a difficulty in holding the flaps steady and stable in each cross-sectional position of the thrust nozzle, i.e., to stop the same in a fixed position, and in particular a further difficulty resides in retaining the adjusting flaps steady and stable in a pre-selected end position of the nozzle, notwithstanding the high gas forces acting against the interior surfaces of the flaps.

The present invention aims at eliminating the disadvantages of the aforementioned known adjusting flap arrangements with the heretofore known thrust nozzles, and to create a thrust nozzle whose flap adjustment can be realized very rapidly and which requires for that purpose small adjusting forces so that, connected therewith, the necessary adjusting mechanisms can be of more light-weight and more space-saving construction and design and the necessary driving motor of the flap actuation can be designed with a smaller power output.

Furthermore, it is the aim of the present invention to so construct the adjusting mechanism of the flaps as well as the flaps themselves that they are held stable and vibration-free in every necessary end position.

As solution to the underlying problems the present invention primarily proposes with a thrust nozzle of the aforementioned type that the nozzle flaps are adapted to be extruded out of the uniformly tapering fuselage tail of the aircraft for the reduction of the gas discharge cross-section and are adapted to be retracted into the fuselage tail of the aircraft for the increase of the gas discharge cross-section whereby the flaps in the extended position form an extension of the tail-end of the fuselage.

On the basis of the thrust nozzle proposed in accordance with the present invention it is very advantageous that the nozzle flap adjusting movement takes place approximately perpendicularly to the direction of the occurring gas forces so that the gas forces do not cause any additional forces opposite the direction of the adjusting movement of the nozzle flaps. In contrast to the aforementioned prior art thrust nozzle arrangements, the gas forces thus cause no additional power output requirement for the adjusting movement of the nozzle flaps.

According to a further feature of the present invention, provision is made that the nozzle flaps are displaceably arranged parallelly to the contour of the aircraft fuselage tail and are circumferentially spaced with respect to the center line of thrust nozzle.

Owing to this inventive feature it further follows that the desired gas discharge cross-section caused by the adjustment of the flap is always present. The nozzle flaps can be constructed as trapezoidally-shaped cylindrical sections which, in each position of the thrust nozzle, form in combination an approximately symmetrical gas discharge cross-section.

According to a further feature and development of the present invention the adjustment movement of the nozzle flaps can be realized by means of outrigger-type brackets which are displaceably guided approximately parallel to the fuselage tail contour of the aircraft by means of rollers secured at the aircraft fuselage tail and which are supported at these rollers whereby each bracket includes both a forward as well as a rearward elongated-aperture-like roller guidance for the rollers secured at the fuselage tail end of the aircraft.

The rollers provided for the support and guidance of the brackets take care of a stabilization and steady support of the nozzle flaps both in the retracted as also in the extended position thereof.

The reinforcing rings proposed according to a further feature of the present invention and secured at the tail end of the aircraft for the roller supports of the brackets contribute further to the considerable stabilization and steady support of the adjusting mechanism as well as of the nozzle flaps in each desired end position of the nozzle.

The present invention further provides that for the purpose of the downstream support of a nozzle flap, each outrigger-type bracket is provided on short arms angularly bent on both sides with additional rollers adjoining the rear roller guidance whereby the nozzle flaps are supported at these additional rollers by means of guide rails in which the rollers are slidably guided.

The additional rollers adjoining the rear roller guidance for the downstream support of the nozzle flaps further contribute primarily for the stable position of the nozzle flaps in the fully extended position because in the fully extended position the principal portion of the gas forces acting internally on the nozzle flaps has to be absorbed at these places of the flaps, i.e., therefore at the rollers to the rear of the roller guidances.

It is additionally of considerable advantage that, as further proposed by the present invention, each nozzle flap essentially consists of an upper wall portion and of a lower wall portion and is provided with a hollow space formed by these two wall portions, and in that two guide rails are coordinated to a respective roller each, of which one guide rail is secured at the inner side of the upper wall portion and the other guide rail at the inner side of the lower wall portion whereby the direction of movement of a roller corresponds or coincides in each case with the direction of the associated guide rail.

As a result of this arrangement the nozzle flaps are also securely retained and supported at the downstream end thereof. The guide rails serving for the downstream guidance of the flaps and for the sliding of the rollers, assure additionally, inter alia, the completely satisfactory guidance of the flaps both as regards the movement thereof parallel to the tail-end contour of the fuselage as also as regards the movement thereof away from one another or toward one another, in dependence in each case on the required cross-sectional change of the thrust nozzle.

In order that the nozzle flaps are safely guided and supported at the upstream ends thereof, the present invention proposes that each bracket is provided with a pair of laterally angularly bent guide rails, along which the nozzle flaps are slidingly guided and supported with the upstream ends thereof whereby the direction of an upstream guide rail coordinated to a nozzle flap extends parallel to a guide rail arranged at a nozzle flap on the same side of the bracket and to the rear thereof.

Appropriately an outrigger-type bracket may be arranged according to the present invention between two nozzle flaps. A nozzle flap is thus slidably guided thereby on a respective side of a bracket, supporting itself on one-half of its side.

For the purpose of producing the adjusting movement of the flaps the present invention further provides at each bracket, and more particularly between the roller guidances, a rotatably supported gear wheel which during the displacement of the bracket engages on the one hand, into a toothed arrangement secured at the fuselage tail-end of the aircraft and extending approximately parallelly thereto, between the securing points of the rollers serving for the guidance of the bracket whereby this gear wheel, on the other hand, engages with a toothed rack which is pivotally connected at its downstream end with two adjacent nozzle flaps, respectively.

The transmission ratio between the gear wheel rotatably supported at the bracket and the toothed rack actuated by the gear wheel can thereby be made in such a manner that with a displacement of the bracket, the toothed rack is displaced simultaneously with an adjusting velocity that is twice as large as that of the bracket. This would therefore mean in practice approximately a transmission of gear wheel to toothed rack in the ratio of 1:2. It follows therefrom that the individual nozzle flaps can be actuated extraordinarily rapidly which is of particular significance with aircrafts having turbo-jet power-plants or propulsion units that include an after-burner which, as is known, is to be adapted to be engaged in case of need in extraordinarily short periods of time so that the extraordinarily rapid adjusting velocity of the flaps which is possible as proposed by the present invention, takes into consideration and fulfills in particular this requirement.

According to the present invention, for the purpose of the pivotal connection of a toothed rack with two adjacent nozzle flaps, the toothed rack is to include at the downstream end spherically shaped or ball-like guide bodies secured at cross arms, at which the nozzle flaps are transversely displaceably supported by means of guide grooves.

The proposed connection of the toothed racks with the nozzle flaps has provded itself particularly advantageous insofar as, inter alia, all nozzle flaps can be simultaneously actuated in this manner, and furthermore all flaps are connected with each other in this manner. Furthermore, due consideration is given on the basis of this proposal that in case of a failure or breakdown of an actuating mechanism associated with a nozzle flap, it will still be assured that the remaining brackets adjacent to a bracket as well as the associated toothed racks actuate also, for example, a broken down adjusting mechanism. Therebeyond the ball-like guide bodies secured at the cross arms effect in cooperation with the guide grooves arranged transversely to the flap axis the adaptation to the axial as well as tangential movement of the nozzle flaps which occurs with the solution proposed by the present invention. This arrangement is such as to compensate for the various adjustment positions of the nozzle flaps.

The adjusting movement of the brackets and therewith of the nozzle flaps can take place by means of an adjusting motor, such as a pneumatic motor, a hydraulic motor or an electric motor which transmits by way of a transmission connected in its output its rotary movement to several bevel or miter wheel gears included in the fuselage tail contour which are connected with each other by way of flexible shafts or joint shafts, and each bevel wheel gear drives a spindle associated with a respective bracket with the same angular velocity whereby circulating ball-type nuts arranged at the spindles, which are connected with the brackets, cause the adjustment of the brackets as well as also of the nozzle flaps.

With the arrangement of the nozzle flaps according to the present invention, the latter must necessarily be arranged with a circumferential spacing relative to one another when in the completely opened position by reason of the gas discharge cross-section to be changed in case of need and of the resultant movement of the edges of the flaps in the circumferential direction of the thrust nozzle connected therewith, either toward or away from one another. In order to assure that the thrust nozzle is sealed in every position, both from the inside toward the outside as well as from the outside toward the inside, the present invention additionally proposes for that purpose that the intermediate spaces formed between the nozzle flaps are covered off by external seal flaps and internal seal flaps whereby for the gas-tight sealing of the nozzle flaps, seals are arranged between the lower wall portions thereof and the interior surfaces of the inner seal flaps, and furthermore for the sealing of the thrust nozzle from the inside with respect to the atmosphere, seals are provided between the outer seal flaps and the upper wall portions of the nozzle flaps.

In order to further achieve a safe guidance and support of the seal flaps in consonance with the movement of the nozzle flaps, an external and/or internal seal flap may be secured according to the present invention at a toothed rack.

In order to assure additionally that the inner seal flaps are also retained upstream from below at the lower wall portions of the nozzle flaps, the inner seal flaps may be retained by means of spring elements supported on the inside thereof, adapting themselves to and abutting at the associated seals of the lower wall portions of the nozzle flaps.

The inner seal flaps may be further retained according to the present invention, and more particularly at the downstream end of the thrust nozzle, at the upper wall portions of the nozzle flaps by means of wires connecting with each other the inner seal flaps and outer wall portions of the nozzle flaps.

Furthermore, according to the present invention the upper and lower wall portions of the nozzle flaps as well as also the inner and outer seal flaps may be provided with longitudinally profiled external edges, by means of which the upper wall portions and outer seal flaps as well as the lower wall portions and inner seal flaps engagingly overlap each other.

By reason of these profiled grooves mutually overlapping at the outer edges of the flaps, the upper and lower wall portions of the nozzle flaps may carry out the necessary axial or tangential movement during the adjustment of the thrust nozzle.

Finally according to a further feature and development of the inventive subject matter, the inner seal flaps may be equipped with pressure equalization means, for example, in the form of bores, slots or the like.

These and further objects, features and advantages of the present invention will become more obvious from the following description when taken in connection with the accompanying drawing which shows, for purposes of illustration only, one embodiment in accordance with the present invention, and wherein.

Figure 1:
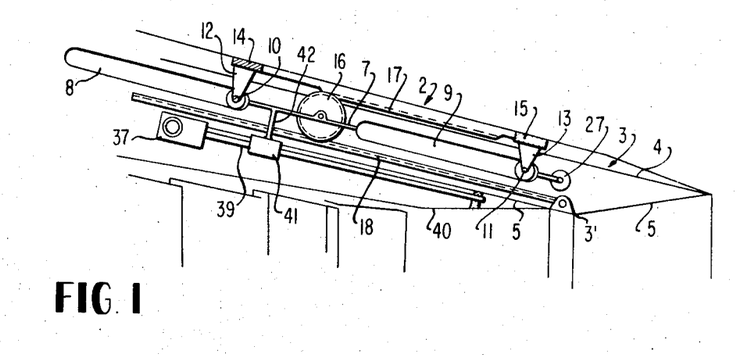
FIG. 1 is a partial, somewhat schematic cross-sectional side view of an upper fuselage tail-end of an aircraft including a part of the thrust nozzle as well as the associated actuating means for the adjustment of the nozzle flaps in accordance with the present invention.
Figure 3:
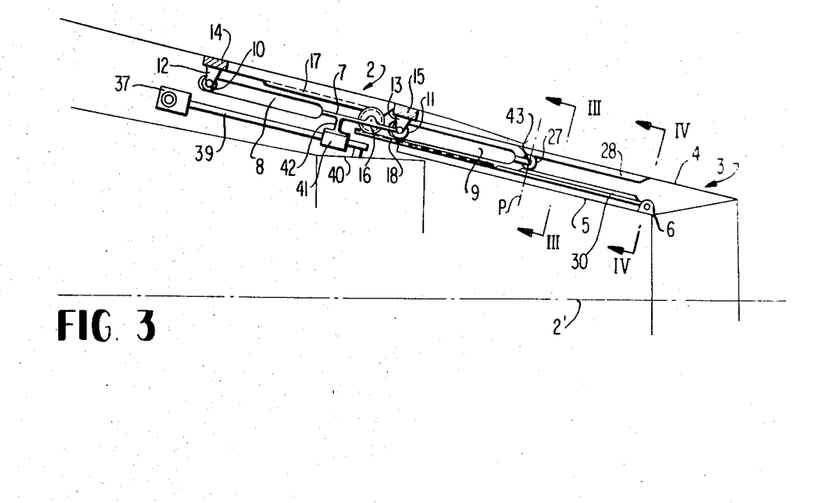
FIG. 3 is a partial, somewhat schematic cross-sectional side view, similar to FIG. 1, of the upper tail-end inclusive a portion of the thrust nozzle as well as the associated adjusting means in accordance with the present invention, but illustrating the position of the nozzle flaps in the extended position thereof.

Referring now to the drawing wherein like reference numerals are used throughout the various views to designate like parts, and more particularly to FIG. 1, reference numeral 2 generally designates in this Figure the tail-end of the aircraft fuselage. As can be further seen from FIG. 1, the nozzle flaps generally designated by reference numeral 3 are retracted in their entire length into the fuselage tail-end of the aircraft so that in this manner the largest gas discharge cross-section is formed at the place 3' extending coaxially to the nozzle longitudinal axis 2' (FIG. 3).

All nozzle flaps 3 consist of an upper wall portion 4 and of a lower wall portion 5.

Figure 2:
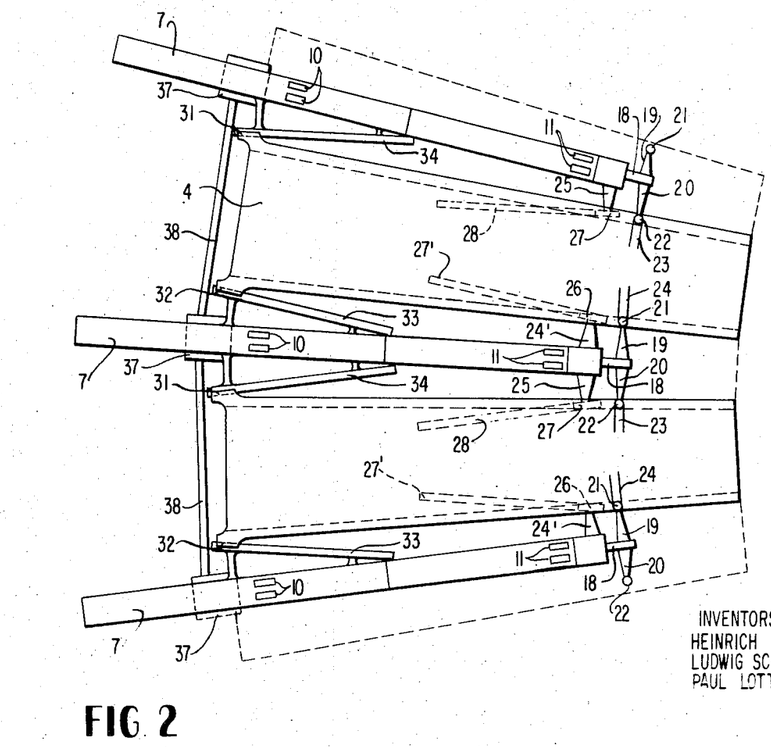
FIG. 2 is a schematic top plan view illustrating the association of several nozzle flaps to each other as well as the adjusting mechanisms necessary for the adjustment thereof, unfolded into a horizontal plane.

FIG. 2 schematically illustrates, unfolded into a horizontal plane, the upper wall portions 4 of the nozzle flaps 3 retracted into the tail-end 2, as viewed from above.

Figure 4:
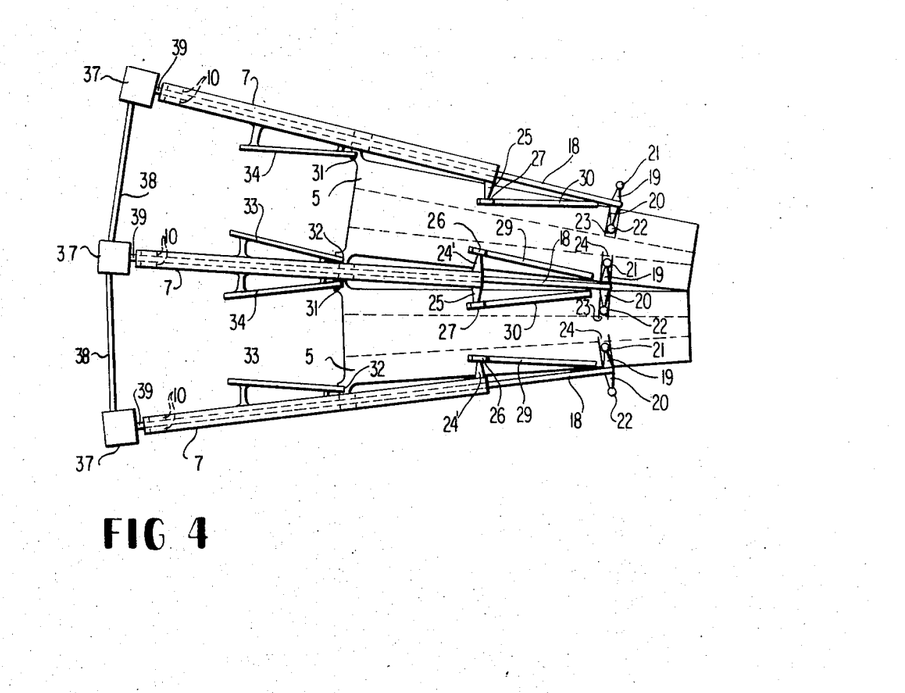
FIG. 4 is a schematic top plan view, similar to FIG. 2, of the nozzle flaps as well as of the associated adjusting means, but illustrating the extended position of the nozzle flaps.

The lower wall portions 5 are in each position of a nozzle flap 3 congruent with the upper wall portions 4. For the sake of better clarity, however, only the lower wall portions 5 are illustrated in FIG. 4 in the fully extended end position thereof.

FIG. 3 discloses the details of the fully extended end position of a nozzle flap 3 consisting of the upper wall portion 4 and of the lower wall portion 5. The smallest gas discharge cross-section of the thrust nozzle is located thereby at the place 6 extending coaxially to the nozzle longitudinal center axis 2'.

As can be further seen from FIGS. 1 and 2, all of the nozzle flaps 3 are actuated simultaneously by means of identical outrigger-type brackets 7 which are displaceable on the inside of the tail-end 2 approximately parallelly to the tapering tail-end contour thereof, and more particularly these brackets 7 are provided with elongated-aperture-like roller guide means 8 and 9, of any conventional construction, in which the rolls 10 and 11 are guided axially displaceably which, in turn, are retained by way of webs 12 and 13 at reinforcing rings 14 and 15 extending coaxially to the nozzle longitudinal center axis 2'. The reinforcing rings 14 and 15, in their turn, are securely arranged at the inner wall of the fuselage tail-end 2 of the aircraft. A gear wheel 16 is rotatably supported at each bracket 7 between the two elongated aperture-like roller guide means 8 and 9. This gear wheel 16 engages, on one hand, with the teeth of a toothed arrangement 17, which is arranged internally at the fuselage tail-end 2 of the aircraft between the reinforcing rings 14 and 15. At the opposite, lower side each gear wheel 16 associated with a respective bracket 7 engages in toothed racks 18 arranged parallelly to brackets 7. The toothed racks 18 are provided at the downstream ends thereof with cross arms 19 and 20 (FIGS. 2 and 10), at the ends of which are arranged balls or ball-like guide bodies 21 and 22. The ball-like guide bodies 21 and 22 which are secured at the toothed racks 18, engage in guide grooves 23 and 24 of respective two adjacent nozzle flaps 3 (see also FIG. 10).

As can be further seen from FIGS. 1 and 2, each bracket 7 is provided for the downstream bearing support of a nozzle flap 3, in extension to the rear roller guide means 9, with additional rollers 26 and 27 (see also FIG. 6), mounted on short arms 24' and 25 angularly bent on both sides; the nozzle flaps 3 are supported with the upper wall portions 4 thereof at the rollers 26 and 27 by means of guide rails 27' and 28 in which the rollers 26 and 27 are slidably guided. The associated guide rails for the rollers 26 and 27 which are secured in a conventional manner at the lower wall portions 5 are designated by reference numerals 29 and 30 (FIG. 4).

Upstream the nozzle flaps 3 are supported with the ends 31 and 32 of the upper wall parts 4 or of the lower wall portions 5 on guide rails 33 and 34 arranged laterally angularly bent at each bracket 7. Consequently, a guide rail 33, 34 secured at the bracket 7 is coordinated for the purpose of the sliding guidance and support of each upstream end 31, 32 of a nozzle flap 3. The guide rails 28 and 30 (FIGS. 2 and 4) of a roller 27 associated with a bracket 7 which extends parallelly to a guide rail 34, are coordinated facing one another, while two mutually facing guide rails 27', 29 (FIGS. 2 and 4) of a roller 26 associated with a bracket 7 which extend also parallelly to a guide rail 33 of the bracket 7, are coordinated facing one another. Consequently, each nozzle flap 3 is supported with each half side at a respective one of two adjacent brackets 7.

Figure 5:
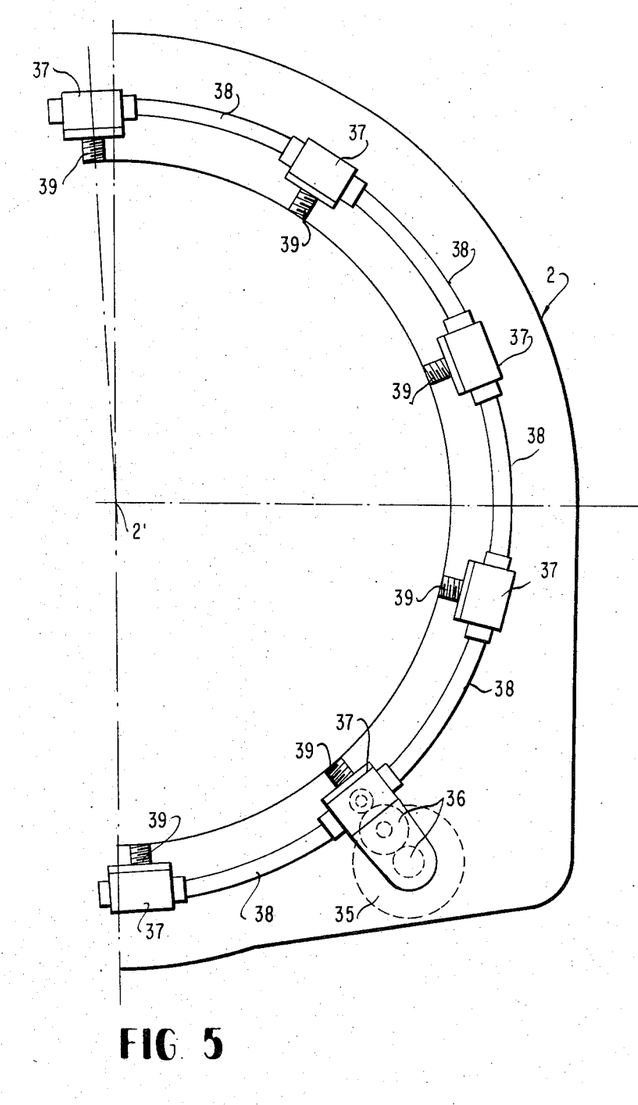
FIG. 5 is a partial, somewhat schematic view of a right cross-sectional half of the upstream tail-end of the aircraft fuselage, illustrating further installations inclusive drive motor, bevel gearing, flexible shafts, for the actuation of the nozzle flaps in accordance with the present invention.

The adjusting movement of the individual nozzle flaps 3 takes place as follows:

According to FIG. 5, illustrating a semi-circularly shaped cross-section of the tail-end 2, a driving motor 35 is included in the fuselage tail contour which transmits its driving output by way of a reduction gear 36 to several bevel gears 37 which, in turn, are connected with each other by flexible shafts 38 arranged coaxially to the nozzle longitudinal center axis 2'. Spindles 39 connected with the bevel or miter gears 37 are driven by the latter (FIG. 1); the spindles 39 also extend parallelly to the toothed racks 18 and to the bracket 7 and are supported at a fixed part 40 of the thrust nozzle, and more particularly in the area of the downstream end. A conventional circulating-ball-nut 41 is mounted on each spindle 39 which is rigidly connected with the bracket 7 by way of securing member 42 (FIGS. 1 and 3). During the actuation of the thrust nozzle adjusting mechanism for the changing of the gas discharge cross-section of the thrust nozzle, the drive motor 35 thus transmits its driving power by way of the reduction gear 36, the bevel gearings 37 as well as the flexible shafts 38 to spindles 39 (FIG. 1) and thus all spindles 39 are driven with the same angular velocity and all circulating-ball-nuts 41 with the same adjusting velocity. The adjusting movement of the brackets 7 and of the nozzle flaps 3 takes place in accordance with the corresponding adjusting velocity of the circulating-ball-nuts 41, and more particularly by way of the gear wheels 16 associated with the brackets 7 which bring about the adjusting movement of the nozzle flaps 3 by the engagement with the toothed arrangements 17, on the one hand, and with the toothed racks 18, on the other.

FIGS. 3 and 4 illustrated, as already mentioned, in contrast to FIGS. 1 and 2, the fully extended end position of the nozzle flaps 3, corresponding to the smallest possible required gas discharge cross-section 6 of the thrust nozzle. In this position of the thrust nozzle the resultant P of the gas forces acting internally on a nozzle flap 3 always passes through the surface center of gravity 43 of the lower wall portion 5 of a nozzle flap 3 (FIG. 3). And more particularly, this is true approximately in every extended position of the nozzle flaps 3. Furthermore, in each position of the nozzle flaps 3, the rollers 26, 27 of a bracket 7 are arranged within the area of the surface center of gravity 43 of a lower wall portion 5 of each nozzle flap 3. This is thereby achieved essentially also by the more rapid adjusting velocity of the nozzle flaps 3 compared to the slower adjusting velocity of the brackets 7, as a result of the transmission ratio of gear wheel 16 to toothed rack 18 approximately in the ratio of 1:2.

It may further be seen from FIGS. 3 and 4 that also in the fully extended position of the nozzle flaps 3, illustrated in these Figures, a safe guidance and support thereof is assured. In order to return the nozzle flaps 3 from the position according to FIGS. 3 and 4 into the position according to FIGS. 1 and 2, no adjusting forces have to be overcome which would have to be overcome by reason of the gas forces prevailing on the inside of the thrust nozzle because the adjustment or displacement of the nozzle flaps 3 takes place essentially perpendicularly to the gas forces acting against the inner surfaces of the nozzle flaps. Consequently, during the adjusting movement of the nozzle flaps 3, only the roller friction caused by the roller bearing support at the brackets 7 as well as the gear friction caused by the gear wheels 16, the toothed racks 18 and the teeth 17, i.e., a relatively small additional power output to be supplied by the driving motor 35 is required.

It can be further seen from FIGS. 1, 2, 3 and 4 that the brackets 7 are each arranged between the nozzle flaps 3, and it can be further seen that above and below each bracket 7 intermediate spaces 59' (FIG. 6) are present which naturally have to be sealed off. In order to cover and seal these intermediate spaces 59' above and below the brackets 7, inner seal flaps 44 as well as outer seal flaps 45 are provided as can be seen from FIG. 6. The inner seal flaps 44 are provided with profile grooves 46 and 47 extending parallel to the outer edges thereof while the upper seal flaps 45 are provided with the profile grooves 48 and 49 along the outer edges thereof.

Figure 6:
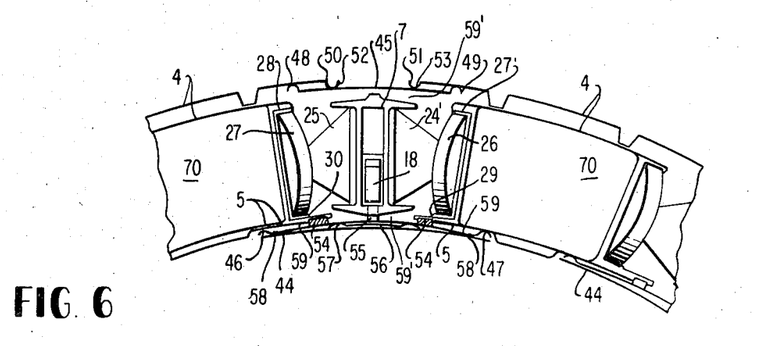
FIG. 6 is a partial, somewhat schematic cross-sectional view of the thrust nozzle in accordance with the present invention, illustrating details of the nozzle and seal flaps including the adjusting mechanisms necessary for the movement thereof and taken along line III—III of FIG. 3.

As can be further seen from FIG. 6, further guide grooves 50 and 51 are also provided at the upper wall portions 4 of the nozzle flaps 3 and more particularly along the outer edges thereof. The outer seal flaps 45 and the upper wall portions 4 of the nozzle flaps 3 mutually overlap by means of these profile grooves 48, 50, 49, 51, and in this particular construction, according to FIG. 6, the upper wall portions 4 of the nozzle flaps 3 are thus displaceably and slidably guided with the profile grooves 50 and 51 thereof on the surface of each outer seal flap 45 both axially as also in the circumferential direction of the thrust nozzle.

The surfaces of the profile grooves 50, 51 associated with the upper wall portions 4 of the nozzle flaps 3 may be constructed simultaneously as seals 52, 53 of conventional construction, and more particularly for the purpose of sealing the thrust nozzle with respect to the external atmosphere.

Furthermore, seals 54 (FIG. 6) are provided between the inner surfaces of the inner seal flaps 44 and the outer surfaces of the lower wall portions 5 of nozzle flaps 3, consisting for example, of a conventional graphite-/wire-structure. These seals 54, for example as illustrated, may be secured at the outer surfaces of the lower wall portions 5 of the nozzle flaps 3, and more particularly for the purpose of sealing the thrust nozzle from the inside toward the outside, i.e., for its gas-tight seal. As can be further seen from FIG. 6, the toothed racks 18 provided for the actuation of the nozzle flaps 3 may, in deviation from the schematic illustration thereof in FIGS. 1–4, be axially displaceable on the inside of the brackets 7 and, in order to simultaneously move along also the inner seal flaps 44 simultaneously with the adjusting movement of the nozzle flaps 3 and to retain the inner seal flaps 44 against the lower wall portions 5 of the nozzle flaps 3, the inner seal flaps 44 may be connected with the toothed racks 18, and more particularly by means of a bolt 55 secured at each toothed rack 18; folds 56 arranged at the lower end of the bolts 55 may retain the seal flaps 44 at the nozzle flaps 5, if the thrust nozzle is out of operation and therewith no gas pressure is present. On the inside of the inner seal flaps 44, leaf spring-like springs 57 may furthermore take care of a uniform abutment of the inner seal flaps 44 at the lower wall portions 5 of the nozzle flaps 3. Moreover, mutually corresponding pressure equalization bores 58 may be provided in the inner and outer surfaces of the inner seal flaps 44 which bring about an equalization of the gas pressure between the nozzle space and the interior spaces 59 that are arranged between the profile grooves 46, 47 and the seals 54. The guide rails 28 and 30 of the rollers 27 as well as the guide rails 27' and 29 of the rollers 26 can be further seen in FIG. 6.

Figure 7:
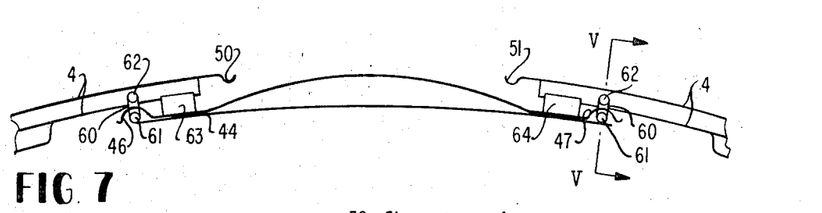
FIG. 7 is a somewhat schematic, partial cross-sectional view illustrating further details of the arrangement and mounting of the lower seal flaps at the outer wall portions of the nozzle flaps in accordance with the present invention, in a first end position thereof.
Figure 8:
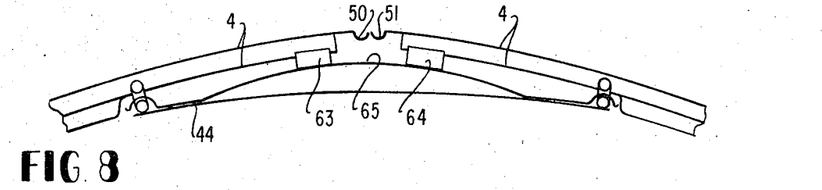
FIG. 8 is a somewhat schematic, partial cross-sectional view, similar to FIG. 7, but illustrating the parts thereof in a second end position of the thrust nozzle as a result of axial and tangential displacement of the nozzle flaps.

A further manner of securing the rear, downstream ends of the lower seal flaps 44 at the upper wall portions 4 of the nozzle flaps 3 is illustrated by reference to FIGS. 7 and 8; it consists in that U-shaped bent wires 60 are securely inserted with their one ends 61 into outer edges formed by the profile grooves 46, 47 of the inner seal flaps 44 whereby these wirings 60 are displaceably guided in the circumferential direction of the nozzle and retained with the other ends 62 thereof on the inside of the upper wall portions 4 of the nozzle flaps 3. It can be clearly seen from FIGS. 7 and 8 that for the fully open end position of the thrust nozzle, according to FIG. 7, the profile grooves 50, 51 disposed in the outer edges of the upper wall portions 4 of the nozzle flaps 3, have a larger spacing from one another than in FIG. 8, illustrating the smallest possible cross section of the thrust nozzle whereby the profile grooves 50, 51 abut against one another, and whereby simultaneously the seals 63, 64, which are secured internally at the upper wall portions 4 of the nozzle flaps 3, are displaced over a rounded-off arch portion 65 at the surface of the inner seal flaps 44.

Figure 9:
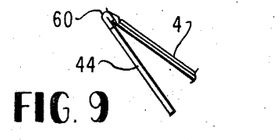
FIG. 9 is a partial cross-sectional view taken along line V—V of FIG. 7.

From the cross-sectional view of FIG. 9, taken along line V—V of FIG. 7, one can clearly see the manner of securing, described and illustrated by reference to FIGS. 7 and 8, of the inner seal flaps 44 at the upper wall portions 4 of the nozzle flaps 3, and more particularly at the downstream thrust nozzle end by the use of the described U-shaped wires 60.

Figure 10:
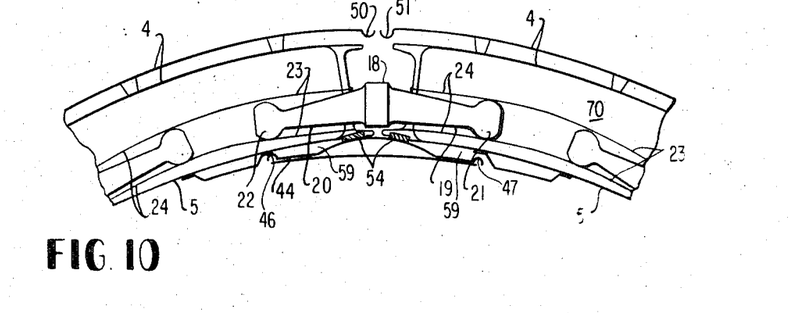
FIG. 10 is a further partial cross-sectional view of a thrust nozzle in accordance with the present invention, taken along line IV—IV of FIG. 3 and illustrating details of the actuating means according to the present invention for the adjustment of the nozzle flaps.

FIG. 10 finally illustrates a partial cross-section of the nozzle, and more particularly as viewed from the rear, within an area of a thrust nozzle to the rear of the toothed racks 18. One can readily recognize in this Figure the guide grooves 23 and 24 which extend through the hollow space 70 of a respective nozzle flap 3 in a slightly upwardly curved form and in the transverse direction. It is achieved in this manner that all nozzle flaps 3 can be actuated such that the edges thereof come together in the circumferential direction simultaneously with the axial movement of the flaps.

Finally, it should be noted that the embodiments illustrated by reference to FIGS. 1–10 are not exclusively limited for the application of the present invention since also the possibility exists to provide in lieu, for example, of ten bevel gears 37 (FIG. 5), of ten flexible shafts 48 as well as in lieu of ten spindles 39, only five bevel gears, five flexible shafts or five spindles. Furthermore, the possibility exists with the same number of brackets 7 to reduce the number of bevel gears 37, of the spindles 39 and of the flexible shafts 38 or even to provide a smaller number of brackets 7.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are within the scope of those skilled in the art.

What is claimed:

1. A variable area thrust nozzle for use on a turbo-jet engine, said thrust nozzle being located adjacent the rear end of a fuselage tail having a tapering external configuration, said nozzle comprising a plurality of movable flap means arranged circumferentially about the longitudinal axis of the engine, guide means for guiding each of the respective flap means along a path substantially parallel to the taper of the external configuration disposed radially outwardly of the respective flap means, and adjusting means for reducing the nozzle discharge area by moving the flap means in the rearward direction and for increasing the nozzle discharge area by moving the flap means in the forward direction, said adjusting means including a first toothed rack means fixed to a relatively fixed part of the fuselage tail and a relatively displaceable bracket means guided for movement approximately parallel to the taper of the external configuration of the nozzle, said bracket means including displaceable second toothed rack means in engagement with the flap means and gear wheel means rotatably supported at said bracket means, said gear wheel means being in engagement with both the first and second toothed rack means such that adjusting movement of the flap means is approximately twice as great as the adjusting movement of the bracket means.

2. A thrust nozzle according to claim 1, characterized in that the rearmost extent of the flap means is the same as the rearmost extent of the external configuration of the fuselage tail when the nozzle discharge area is at its maximum.

3. A thrust nozzle according to claim 2, characterized in that the external configuration of the flap means forms a relatively smooth extension of the fuselage tail when the nozzle discharge area is reduced from its maximum.

4. A thrust nozzle according to claim 1, characterized in that the said guide means comprises roller means.

5. A thrust nozzle according to claim 1, characterized in that the adjusting movement of the nozzle flap means takes place with the aid of the bracket means which are displaceably guided approximately parallelly to the tapering external configuration by roller means secured at the fuselage tail and which are supported at said roller means, and in that each bracket means is provided with a forward and a rearward roller guide means for the roller means secured at said fuselage tail.

6. A thrust nozzle according to claim 5, characterized in that said roller guide means are provided with elongated aperture-like means.

7. A variable area thrust nozzle for use on a turbo-jet engine, said thrust nozzle being located adjacent the rear end of the fuselage tail having a tapering external configuration, said nozzle comprising a plurality of movable flap means arranged circumferentially about the longitudinal axis of the engine, guide means for guiding each of the respective flap means along a path substantially parallel to the taper of the external configuration disposed radially outwardly of the respective flap means, and adjusting means for reducing the nozzle discharge area by moving the flap means in the rearward direction and for increasing the nozzle discharge area by moving the flap means in a forward direction, said adjusting means including bracket means supported and displaceably guided approximately parallel to the tapering external configuration by roller means secured to the fuselage tail, each bracket means being provided with a forward and a rearward roller guide means secured at said fuselage tail, said roller guide means being provided with elongated aperture-like means, said roller means being supported at a plurality of separate reinforcing ring means of said fuselage tail, said ring means being axially spaced from one another along the longitudinal axis of the nozzle.

8. A thrust nozzle according to claim 7, characterized by support means for the downstream support of a respective nozzle flap means including additional roller means at each bracket means adjoining the rearward roller guide means and provided on relatively short arms angularly bent on both sides, and guide rail means for supporting the nozzle flap means at said additional roller means, said additional roller means being guided in said guide rail means.

9. A thrust nozzle according to claim 8, characterized in that each nozzle flap means essentially consists of an upper wall portion and of a lower wall portion and is provided with a hollow space formed by these two wall portions, and in that two guide rail means are associated with each additional roller means, of which one guide rail means is secured at the inner side of the upper wall portion and the other guide rail means at the inner side of the lower wall portion, the direction of rolling movement of the additional roller means corresponding substantially with the direction of the associated guide rail means.

10. A thrust nozzle according to claim 9, characterized in that each bracket means includes a pair of laterally bent guide rail means on which the nozzle flap means are adapted to be slidably guided and supported with the upstream ends thereof, the direction of an upstream guide rail means coordinated to a nozzle flap means extending substantially parallelly to a first-mentioned guide rail means arranged on the same side of the bracket means and to the rear thereof at a nozzle flap means.

11. A thrust nozzle according to claim 10, characterized in that a bracket means each is arranged between two nozzle flap means.

12. A thrust nozzle according to claim 10, characterized in that a gear wheel means is rotatably supported at each bracket means which during the displacement of the bracket means engages, on the one hand, in teeth means secured at said fuselage tail and extending approximately parallelly thereto, intermediate the fixing points of the roller means serving for the guidance of the bracket means, and on the other, with a toothed rack means that is pivotally connected at the downstream end thereof with two respective adjacent nozzle flap means.

13. A thrust nozzle according to claim 12, characterized in that a respective gear wheel means is rotatably supported by a corresponding bracket means between the roller guide means thereof.

14. A thrust nozzle according to claim 12, characterized in that for the purpose of the pivotal connection of a toothed rack means with two adjacent nozzle flap means, the toothed rack means is provided at the downstream end thereof with ball-like guide body means secured at cross arms, on which the nozzle flap means are supported transversely displaceably by means of guide grooves.

15. A thrust nozzle according to claim 14, characterized by adjusting motor means for producing the adjusting movement of the bracket means and therewith of the nozzle flap means, said adjusting motor means transmitting its rotary movement to several bevel gear means included in the tail contour which are connected with each other by way of shaft means, each bevel gear means driving an associated spindle belonging to a respective bracket means with the same angular velocity, and circulating ball-type nut means operatively connected with the bracket means and mounted on the spindles which bring about the adjustment of the bracket means as well as of the nozzle flap means.

16. A thrust nozzle according to claim 15, characterized in that said shaft means are flexible shafts.

17. A thrust nozzle according to claim 15, characterized in that said shaft means are jointed shafts.

18. A thrust nozzle according to claim 15, characterized in that the intermediate spaces formed between the nozzle flap means are closed off by outer seal flap means and inner seal flap means, and seal means for the gas-tight seal of the nozzle flap means which are arranged between the lower wall portions thereof and the inner surfaces of the inner seal flap means, and further seal means for sealing the nozzle flap means with respect to the atmosphere which are provided between the outer seal flap means and the upper wall portions of the nozzle flap means.

19. A thrust nozzle according to claim 18, characterized in that at least one of the two parts consisting of outer and inner seal flap means is secured at the toothed rack means.

20. A thrust nozzle according to claim 18, characterized in that both an outer and inner seal flap means is secured at a respective toothed rack means.

21. A thrust nozzle according to claim 18, characterized in that the inner seal flap means are abuttingly retained at the associated seal means of the lower wall portions of the nozzle flap means by spring elements supported on the inside of the inner seal flap means.

22. A thrust nozzle according to claim 21, characterized in that the inner seal flap means are retained at the downstream end of the thrust nozzle against the outer wall portions of the nozzle flap means with the aid of wire means connecting with each other the inner seal flap means and outer wall portions of the nozzle flap means.

23. A thrust nozzle according to claim 22, characterized in that the upper and lower wall portions of the nozzle flap means as well as also the inner and outer seal flap means are provided with longitudinally profiled outer edges, by means of which respectively the upper wall portions and outer sealing flap means as well as the lower wall portions and inner seal flap means overlap one another.

24. A thrust nozzle according to claim 23, characterized in that the inner seal flap means are provided with pressure equalization means.

25. A thrust nozzle according to claim 24, characterized in that the pressure equalization means include apertures.

26. A thrust nozzle according to claim 3, characterized in that the adjusting movement of the nozzle flap means takes place with the aid of the bracket means which are displaceably guided approximately parallelly to the tapering external configuration by roller means secured at the fuselage tail and which are supported at said roller means, and in that each bracket means is provided with a forward and a rearward roller guide means for the roller means secured at said fuselage tail.

27. A thrust nozzle according to claim 26, characterized in that said roller guide means are provided with elongated aperture-like means.

28. A thrust nozzle according to claim 26, characterized in that the roller means are supported at a plurality of separate reinforcing ring means of said fuselage tail, said ring means being axially spaced from one another along the longitudinal axis of the nozzle.

29. A thrust nozzle according to claim 3, characterized by support means for the downstream support of a respective nozzle flap means including roller means at each bracket means provided on relatively short arms angularly bent on both sides, and guide rail means for supporting the nozzle flap means at said roller means, said roller means being guided in said guide rail means.

30. A thrust nozzle according to claim 29, characterized in that each nozzle flap means essentially consists of an upper wall portion and of a lower wall portion and is provided with a hollow space formed by these two wall portions, and in that two guide rail means are associated with each roller means, of which one guide rail means is secured at the inner side of the upper wall portion and the other guide rail means at the inner side of the lower wall portion, the direction of rolling movement of the roller means corresponding substantially with the direction of the associated guide rail means.

31. A variable area thrust nozzle for use on a turbojet engine, said thrust nozzle being located adjacent the rear end of a fuselage tail having a tapering external configuration, said nozzle comprising a plurality of movable flap means arranged circumferentially about the longitudinal axis of the engine, guide means for guiding each of the respective flap means along a path substantially parallel to the taper of the external configuration disposed radially outwardly of the respective flap means, and adjusting means for reducing the nozzle discharge area by moving the flap means in the rearward direction and for increasing the nozzle discharge area by moving the flap means in the forward direction, the rearmost extent of the flap means being the same as the rearmost extent of the external configuration of the fuselage tail when the nozzle discharge area is at its maximum, the external configuration of the flap means forming a relatively smooth extension of the fuselage tail when the nozzle discharge area is reduced from its maximum, the adjusting movement of the nozzle flap means taking place with the aid of bracket means supported and displaceably guided approximately parallel to the tapering external configuration by roller means secured at the fuselage tail, each bracket means being provided with a forward and a rearward roller guide means for the roller means secured at said fuselage tail, each bracket means including a pair of laterally bent guide rail means on which the nozzle falp means are adapted to be slidably guided and supported with the upstream ends thereof.

32. A thrust nozzle according to claim 31, characterized in that a bracket means each is arranged between two nozzle flap means.

33. A variable area thrust nozzle for use on a turbojet engine, said thrust nozzle being located adjacent the rear end of a fuselage tail having a tapering external configuration, said nozzle comprising a plurality of movable flap means arranged circumferentially about the longitudinal axis of the engine, guide means for guiding each of the respective flap means along a path substantially parallel to the taper of the external configuration disposed radially outwardly of the respective flap means, and adjusting means for reducing the nozzle discharge area by moving the flap means in the rearward direction and for increasing the nozzle discharge area by moving the flap means in the forward direction, the rearmost extent of the flap means being the same as the rearmost extent of the external configuration of the fuselage tail when the nozzle discharge area is at its maximum, the external configuration of the flap means forming a relatively smooth extension of the fuselage tail when the nozzle discharge area is reduced from its maximum, the adjusting movement of the nozzle flap means taking place with the aid of bracket means supported and displaceably guided approximately parallel to the tapering external configuration by roller means secured at the fuselage tail, each bracket means being provided with a forward and a rearward roller guide means for the roller means secured at said fuselage tail, a gear wheel means being rotatably supported at each bracket means which during the displacement of the bracket means engages, on the one hand, in teeth means secured at said fuselage tail and extending approximately parallely thereto, and on the other hand, with a toothed rack means that is pivotally connected at the downstream end thereof with two respective adjacent flap means.

34. A thrust nozzle according to claim 33, characterized in that for the purpose of the pivotal connection of a toothed rack means with two adjacent nozzle flap means, the toothed rack means is provided at the downstream end thereof with ball-like guide body means secured at cross arms, on which the nozzle flap means are supported transversely displaceably by means of guide grooves.

35. A thrust nozzle according to claim 33, characterized by adjusting motor means for producing the adjusting movement of the bracket means and therewith of the nozzle flap means, said adjusting motor means transmitting its rotary movement to several bevel gear means included in the tail contour which are connected with each other by way of shaft means, each bevel gear means driving an associated spindle belonging to a respective bracket means with the same angular velocity, and circulating ball-type nut means operatively connected with the bracket means and mounted on the spindles which bring about the adjustment of the bracket means as well as of the nozzle flap means.

36. A variable area thrust nozzle for use on a turbojet engine, said thrust nozzle being located adjacent the rear end of a fuselage tail having a tapering external configuration, said nozzle comprising a plurality of movable flap means arranged circumferentially about the longitudinal axis of the engine, guide means for guiding each of the respective flap means along a path substantially parallel to the taper of the external configuration disposed radially outwardly of the respective flap means, and adjusting means for reducing the nozzle discharge area by moving the flap means in the rearward direction and for increasing the nozzle discharge area by moving the flap means in the forward direction, the rearmost extent of the flap means being the same as the rearmost extent of the external configuration of the fuselage tail when the nozzle discharge area is at its maximum, the external configuration of the flap means forming a relatively smooth extension of the fuselage tail when the nozzle discharge area is reduced from its maximum, said adjusting means including support means for the downstream support of a respective nozzle flap means having roller means at bracket means provided on relatively short arms angularly bent on both sides, and guide rail means for supporting the nozzle flap means at said roller means, said roller means being guided in said guide rail means, each nozzle flap means essentially consisting of an upper wall portion and of a lower wall portion and being provided with a hollow space formed by these two wall portions, two guide rail means being associated with each roller means, of which one guide rail means is secured at the inner side of the upper wall portion and the other guide rail means at the inner side of the lower wall portion, the direction of rolling movement of the roller means corresponding substantially with the direction of the associated guide rail means, the intermediate spaced formed between the nozzle flap means being closed off by outer seal flap means and inner seal flap means, seal means for the gas-tight seal of the nozzle flap means being arranged between the lower wall portions thereof and the inner surfaces of the inner seal flap means, and further seal means for sealing the nozzle flap means with respect to the atmosphere being provided between the outer seal flap means and the upper wall portions of the nozzle flap means.

37. A thrust nozzle according to claim 36, characterized in that the inner seal flap means are abuttingly retained at the associated seal means of the lower wall portions of the nozzle flap means by spring elements supported on the inside of the inner seal flap means.

38. A thrust nozzle according to claim 36, characterized in that the inner seal flap means are retained at the downstream end of the thrust nozzle against the outer wall portions of the nozzle flap means with the aid of wire means connecting with each other the inner seal flap means and outer wall portions of the nozzle flap means.

39. A thrust nozzle according to claim 36, characterized in that the upper and lower wall portions of the nozzle flap means as well as also the inner and outer seal flap means are provided with longitudinally profiled outer edges, by means of which respectively the upper wall portions and outer sealing flap means as well as the lower wall portions and inner seal flap means overlap one another.

40. A thrust nozzle according to claim 39, characterized in that pressure equalization means including apertures are provided in the inner seal flap means.

41. A thrust nozzle according to claim 45, characterized in that the adjusting movement of the nozzle flap means takes place with the aid of the bracket means which are displaceably guided approximately parallelly to the tail-end contour by roller means secured at the tail-end and in that each nozzle flap means includes an upper wall portion and a lower wall portion forming therebetween a hollow space.

42. A variable area thrust nozzle for use on a turbojet engine, said thrust nozzle being located adjacent the rear end of a fuselage tail having a tapering external configuration, said nozzle comprising a plurality of movable flap means arranged circumferentially about the longitudinal axis of the engine, guide means for guiding each of the respective flap means along a path substantially parallel to the taper of the external configuration disposed radially outwardly of the respective flap means, and adjusting means for reducing the nozzle discharge area by moving the flap means in the rearward direction and for increasing the nozzle discharge area by moving the flap means in the forward direction, the adjusting movement of the nozzle flap means taking place with the aid of bracket means which are displaceably guided approximately parallely to the tail-end contour by roller means secured at the tail-end, each nozzle flap means including an upper wall portion and a lower wall portion forming therebetween a hollow space, characterized by adjusting motor means for producing the adjusting movement of the bracket means and therewith of the nozzle flap means, said adjusting motor means transmitting its rotary movement to several bevel gear means included in the tail contour which are connected with each other by way of shaft means, each bevel gear means driving an associated spindle belonging to a respective bracket means with the same angular velocity, and circulating ball-type nut means operatively connected with the bracket means and mounted on the spindles which bring about the adjustment of the bracket means as well as of the nozzle flap means.

43. A variable area thrust nozzle for use on a turbojet engine, said thrust nozzle being located adjacent the rear end of a fuselage tail having a tapering external configuration, said nozzle comprising a plurality of movable flap means arranged circumferentially about the longitudinal axis of the engine, guide means for guiding each of the respective flap means along a path substantially parallel to the taper of the external configuration disposed radially outwardly of the respective flap means, and adjusting means for reducing the nozzle discharge area by moving the flap means in the rearward direction and for increasing the nozzle discharge area by moving the flap means in the forward direction, the adjusting movement of the nozzle flap means taking place with the aid of bracket means which are displaceably guided approximately parallely to the tail-end contour by roller means secured at the tail-end, each nozzle flap means including an upper wall portion and a lower wall portion forming therebetween a hollow space, characterized in that the intermediate spaces formed between the nozzle flap means are closed off by outer seal flap means and inner seal flap means, and seal means for the gas-tight seal of the nozzle flap means which are arranged between the lower wall portions thereof and the inner surfaces of the inner seal flap means, and further seal means for sealing the nozzle flap means with respect to the atmosphere which are provided between the outer seal flap means and the upper wall portions of the nozzle flap means.

44. A thrust nozzle according to claim 43, characterized in that the upper and lower wall portions of the nozzle flap means as well as also the inner and outer seal flap means are provided with longitudinally profiled outer edges, by means of which respectively the upper wall portions and outer sealing flap means as well as the lower wall portions and inner seal flap means overlap one another.

* * * * *